US009393512B2

(12) United States Patent
Schuttenberg

(10) Patent No.: US 9,393,512 B2
(45) Date of Patent: Jul. 19, 2016

(54) PROCESSES FOR REMOVING ENTRAINED PARTICULATES FROM A GAS

(71) Applicant: Pall Corporation, Port Washington, NY (US)

(72) Inventor: Kurt R. Schuttenberg, Freeville, NY (US)

(73) Assignee: Pall Corporation, Port Washington, NY (US)

( * ) Notice: Subject to any disclaimer, the term of this patent is extended or adjusted under 35 U.S.C. 154(b) by 274 days.

(21) Appl. No.: 14/262,348

(22) Filed: Apr. 25, 2014

(65) Prior Publication Data

US 2015/0306531 A1  Oct. 29, 2015

(51) Int. Cl.
*B01D 50/00* (2006.01)
*B01D 46/00* (2006.01)
*B01D 45/12* (2006.01)
*B01D 45/16* (2006.01)
(Continued)

(52) U.S. Cl.
CPC ............ *B01D 46/0042* (2013.01); *B01D 45/12* (2013.01); *B01D 45/16* (2013.01); *B01D 46/005* (2013.01); *B01J 38/30* (2013.01); *B04C 3/00* (2013.01); *B04C 3/06* (2013.01); *B01D 2257/504* (2013.01)

(58) Field of Classification Search
CPC ...... C07C 1/20; C07C 57/145; C07C 51/215; C07C 51/31; C10G 11/18; C10G 11/182; C10N 2210/02; B01D 29/902; B01D 24/12; B01D 24/407; B01D 46/0042; B01D 46/005; B01D 46/48; B01D 46/0095; B01D 46/24; B01D 46/0084; B01J 38/30; B01J 8/006; B01J 8/24; B01J 2208/00991
See application file for complete search history.

(56) References Cited

U.S. PATENT DOCUMENTS 1,928,670 A * 10/1933 McCrery ............ B01D 46/0005
                                                    55/300
2,240,347 A *  4/1941 Page, Jr. ..................... B01J 8/12
                                                    196/119
(Continued)

FOREIGN PATENT DOCUMENTS

EP        0 097 310 A1    1/1984
EP        0 515 878 A2   12/1992
(Continued)

OTHER PUBLICATIONS

European Patent Office, Extended European Search Report in Patent Application No. 15155737.8, mailed Sep. 28, 2015.
(Continued)

*Primary Examiner* — Dung H Bui
(74) *Attorney, Agent, or Firm* — Jeremy Jay

(57) ABSTRACT

In a process for removing entrained particulates from a gas, a chemical reaction may be conducted in a vessel. Conducting the chemical reaction may include suspending particulates in a gas in a fluidized bed in the vessel. A portion of the gas and entrained particulates may be directed to a filter medium and the entrained particulates may be filtered from the gas. Filtering the entrained particulates may include directing the gas from a feed side of the filter medium through the filter medium to a filtrate side of the filter medium and may also include directing at least a portion of the entrained particulates generally tangentially along the feed side of the filter medium to scour the feed side of the filter medium. The particulates may then be directed from the feed side of the filter medium into a dip leg.

10 Claims, 1 Drawing Sheet

(51) Int. Cl.
  *B04C 3/00* (2006.01)
  *B04C 3/06* (2006.01)
  *B01J 38/30* (2006.01)

(56) References Cited

U.S. PATENT DOCUMENTS

| | | | |
|---|---|---|---|
| 2,429,751 A * | 10/1947 | Gohr | B01J 8/005 208/161 |
| 2,584,378 A | 2/1952 | Beam | |
| 2,650,084 A * | 8/1953 | White | B01J 8/32 110/245 |
| 2,892,510 A * | 6/1959 | Wygant | B01D 46/0005 55/302 |
| 3,455,457 A | 7/1969 | Popelar | |
| 3,471,024 A | 10/1969 | Doucet | |
| 3,594,991 A | 7/1971 | Berz et al. | |
| 3,690,842 A | 9/1972 | Lockwood | |
| 3,828,930 A | 8/1974 | Eimer et al. | |
| 3,875,063 A | 4/1975 | Treplin et al. | |
| 3,973,935 A | 8/1976 | Moore et al. | |
| 4,010,013 A * | 3/1977 | Murayama | B01D 46/02 55/286 |
| 4,229,189 A * | 10/1980 | Pircon | B01D 50/008 55/324 |
| 4,277,260 A * | 7/1981 | Browning | B01D 46/0068 118/326 |
| 4,360,364 A * | 11/1982 | Kohl | B01D 46/34 55/284 |
| 4,435,282 A | 3/1984 | Bertolacini et al. | |
| 4,569,682 A * | 2/1986 | Baker, Jr. | B01D 51/04 208/127 |
| 4,637,473 A * | 1/1987 | Gillis | A62C 37/00 169/61 |
| 4,731,100 A * | 3/1988 | Loeffelmann | B01D 46/0068 55/294 |
| 4,865,627 A * | 9/1989 | Dewitz | B01D 46/002 55/283 |
| 4,869,207 A * | 9/1989 | Engstrom | B01J 8/006 110/216 |
| 4,965,232 A | 10/1990 | Mauleon et al. | |
| 4,973,458 A * | 11/1990 | Newby | B01D 53/12 422/144 |
| 5,078,760 A * | 1/1992 | Haldipur | C10K 1/02 55/302 |
| 5,104,429 A | 4/1992 | Miller | |
| 5,124,291 A | 6/1992 | Bremer et al. | |
| 5,316,662 A | 5/1994 | Cetinkaya | |
| 5,427,596 A * | 6/1995 | Jorgenson | B01D 46/0068 55/283 |
| 5,567,228 A * | 10/1996 | Abdulally | B01D 53/508 422/142 |
| 5,645,620 A * | 7/1997 | Shenker | B01D 50/002 55/315.1 |
| 5,766,281 A * | 6/1998 | Luy | B01D 46/0067 95/281 |
| 5,868,807 A * | 2/1999 | Luy | B01D 46/002 55/302 |
| 6,149,716 A * | 11/2000 | Bach | B01D 46/0068 55/283 |
| 6,451,091 B1 * | 9/2002 | Avina | B01D 46/44 55/341.1 |
| 6,569,217 B1 | 5/2003 | DeMarco | |
| 6,863,868 B1 * | 3/2005 | Alvin | B01D 39/2027 422/168 |
| 7,850,750 B2 * | 12/2010 | Park | B01D 46/0013 55/301 |
| 7,915,191 B2 | 3/2011 | Hedrick | |
| 7,932,204 B2 | 4/2011 | Towler | |
| 7,935,314 B2 | 5/2011 | Couch et al. | |
| 7,947,230 B2 | 5/2011 | Palmas et al. | |
| 8,017,083 B2 | 9/2011 | Senetar et al. | |
| 8,022,022 B2 | 9/2011 | Nelson et al. | |
| 8,025,705 B2 | 9/2011 | Holle et al. | |
| 8,062,506 B2 | 11/2011 | Hedrick et al. | |
| 8,303,688 B2 | 11/2012 | Sharma | |
| 2003/0192432 A1 * | 10/2003 | Gubler | B01D 46/0058 95/280 |
| 2003/0233064 A1 * | 12/2003 | Arm | A61M 1/3693 604/4.01 |
| 2005/0039400 A1 * | 2/2005 | Lau | B01D 53/22 48/198.3 |
| 2008/0006290 A1 * | 1/2008 | Yamanaka | B01D 41/04 134/1 |
| 2010/0126350 A1 * | 5/2010 | Sharma | B01D 29/904 95/268 |
| 2010/0163495 A1 | 7/2010 | Merino et al. | |
| 2010/0248943 A1 | 9/2010 | Bozzano | |
| 2010/0303698 A1 | 12/2010 | Mehlberg et al. | |
| 2011/0110829 A1 | 5/2011 | da Silva Ferreira Alves et al. | |
| 2011/0155634 A1 | 6/2011 | Lomas et al. | |
| 2011/0155642 A1 | 6/2011 | Huziwara et al. | |
| 2011/0269620 A1 | 11/2011 | Myers et al. | |
| 2011/0297584 A1 | 12/2011 | Chen | |
| 2014/0150654 A1 * | 6/2014 | Llamas | B01J 8/34 95/271 |

FOREIGN PATENT DOCUMENTS

| | | | |
|---|---|---|---|
| EP | 0 551 951 A1 | 1/1993 | |
| FR | 2979225 A1 * | 3/2013 | A61C 7/10 |
| GB | 537017 A | 6/1941 | |
| GB | 1 574 777 A | 4/1977 | |
| JP | 62-091221 A2 | 4/1987 | |
| JP | 02-14749 A | 1/1990 | |
| JP | 02-502477 A | 8/1990 | |
| NZ | 204646 A | 10/1986 | |
| WO | WO 89/00660 A1 | 1/1989 | |
| WO | WO 2008/109928 A1 | 9/2008 | |

OTHER PUBLICATIONS

Intellectual Property Office of Singapore, Search Report in Singapore Patent Application No. 10201501509Y, mailed on Sep. 1, 2015.

* cited by examiner

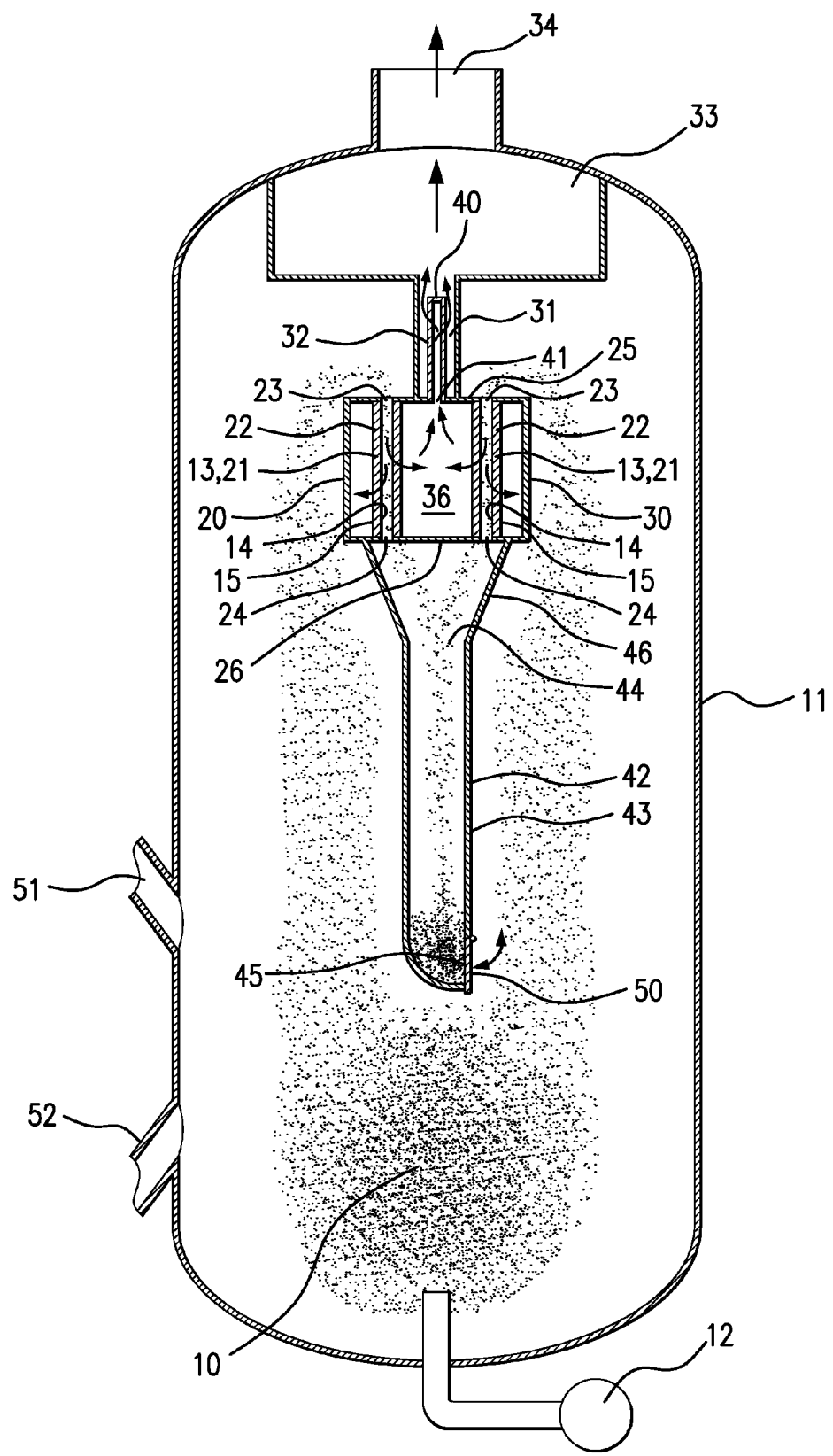

PROCESSES FOR REMOVING ENTRAINED PARTICULATES FROM A GAS

DISCLOSURE OF THE INVENTION

The present invention relates to processes for removing entrained particulates from a gas, where gas may include one or more vapors. Any of numerous types of particulates may become entrained in any of several different gases in a wide variety of ways. For example, many different chemical reactions may result in particulates becoming suspended in a gas. Gases may be generated as a result of the chemical reaction itself, or gases may be supplied to the chemical reaction to facilitate the chemical reaction in any of numerous ways, including, for example, as a promoter or a reactant. Similarly, particulates may be generated during the chemical reaction itself, for example, as reaction products, e.g., combustion products, or particulates may be added to the chemical reaction, for example, as a promoter, reactant, or catalyst. The mixture of these gases and particulates often form a fluidized bed of the particulates suspended in the gas. To contain and confine the gas and suspended particulates, the chemical reactions may be carried out or conducted in a vessel, e.g., a reactor vessel or a regenerator vessel.

Processes embodying the invention may be used with a variety of chemical reactions to remove entrained particulates from a gas, including, for example, combustion reactions, synthesis reactions, decomposition reactions, and catalytic reactions. One of many examples occurs in the refinery and chemical industries, where fouled catalyst particulates may need to be regenerated before they can be reused. The fouled catalyst particulates may be suspended in a fluidized bed of hot gas in a regenerator vessel, where the foulants may be burned off of the catalyst particulates. A portion of the gas and entrained catalyst particulates may be extracted from the fluidized bed, and the entrained catalyst particulates may be removed from the gas in accordance with the processes embodying the invention. The gas may then be discharged, e.g., for further processing or as waste gas to the environment, while the catalyst particulates may be collected for reuse or returned to the fluidized bed for further processing.

Many other industries may utilize fluidized beds of particulates suspended in a gas. For example, in the catalyst manufacturing industry, catalyst particulates may be suspended in a gas in a fluidized bed during calcination or activation. Processes embodying the invention may be used to remove entrained particulates from a gas in all of these industries.

In accordance with one aspect of the invention, processes for removing entrained particulates from a gas may comprise filtering a substantial portion of the entrained particulates from the gas. Filtering the entrained particulates includes directing the gas from a feed side of a filter medium through the filter medium to a filtrate side of the filter medium. As the gas passes through the filter medium, the filter medium removes most or substantially all of the entrained particulates from the gas, leaving the filtered gas on the filtrate side of the filter medium and the particulates on the feed side of the filter medium. Filtering the entrained particulates further includes directing at least a portion of the entrained particulates generally tangentially along the feed side of the filter medium. As the particulates pass tangentially along the feed side of the filter medium, they scour the feed side, preventing foulants, such as a filter cake of removed particulates, from building up on the feed side and blocking off the filter medium. Processes embodying the invention may further comprise directing the particulates from the feed side of the filter medium into a dip leg. The dip leg guides the particulates away from the filter medium, allowing the scoured filter medium to continue filtering the entrained particulates from the gas.

In accordance with another aspect of the invention, processes for removing entrained particulates from a gas may comprise conducting a chemical reaction in a vessel, including forming a fluidized bed of gas and suspended particulates in the vessel. The processes may also comprise directing a portion of the gas and entrained particulates to a filter medium and filtering the entrained particulates from the gas. Filtering the entrained particulates includes directing the gas from a feed side of a filter medium through the filter medium to the filtrate side of the filter medium. As the gas passes through the filter medium, the filter medium removes most or substantially all of the entrained particulates from the gas, leaving the filtered gas on the filtrate side of the filter medium and the particulates on the feed side of the filter medium. Filtering the entrained particulates further includes directing at least a portion of the entrained particulates generally tangentially along the feed side of the filter medium. As the particulates pass tangentially along the feed side of the filter medium, they scour the feed side, preventing foulants, such as a filter cake of removed particulates, from building up on the feed side and blocking off the filter medium. Processes embodying the invention may further comprise directing the particulates from the feed side of the filter medium into a dip leg. The dip leg guides the particulates away from the filter medium, allowing the scoured filter medium to continue filtering the entrained particulates from the gas. For many, but not all, processes embodying the invention, the particulates may be filtered from the gas in the vessel containing the fluidized bed and the particulates may be directed to a dip leg in the vessel. The filtered gas may then be discharged from the vessel, and the particulates may be directed from the dip leg out of the vessel for disposal or reuse or back into the fluidized bed for further processing.

In accordance with another aspect of the invention, processes for removing entrained catalyst particulates from a gas may comprise regenerating catalyst particulates in a regenerator vessel, including forming a fluidized bed of hot gas and suspended catalyst particulates in the regenerator vessel. The processes may also comprise filtering a substantial portion of entrained catalyst particulates from the gas in the regenerator vessel. Filtering the entrained catalyst particulates includes directing the gas from a feed side of a filter medium in the regenerator vessel through the filter medium to a filtrate side of the filter medium. As the gas passes through the filter medium, the filter medium removes most or substantially all of the catalyst particulates from the gas, leaving the filtered gas on the filtrate side of the filter medium and the catalyst particulates on the feed side of the filter medium. Filtering the entrained catalyst particulates also includes directing at least a portion of the entrained catalyst particulates generally tangentially along the feed side of the filter medium. As the catalyst particulates pass tangentially along the feed side of the filter medium, they scour the feed side, preventing foulants, such as a filter cake of removed catalyst particulates, from building up on the feed side and blocking off the filter medium. Processes embodying the invention may further comprise discharging the filtered gas from the regenerator vessel and directing the catalyst particulates from the feed side of the filter medium into a dip leg in the regenerator vessel. The dip leg may guide the catalyst particulates away from the filter medium. For example the catalyst particulates may be directed from the dip leg to the exterior of the regenerator vessel for reuse or back into the fluidized bed within the regenerator vessel for further processing.

Processes embodying the invention have many advantageous features. For example, by directing the gas through a filter medium, a very large portion of the entrained particulates, including the fine particulates, may be effectively and efficiently removed from the gas. Consequently, components downstream of the filter medium, such as pipes, valves, or heat exchangers, function more reliably because the filtered gas has few if any particulates to foul or abrade the downstream components. The environment is better protected because any emissions of the filtered gas have exceedingly few particulates. For example, emissions of the filtered gas may have a particulate load as low as about 15 mg/Nm$^3$ or less, e.g., 10 mg/Nm$^3$ or less, 5 mg/Nm$^3$ or less, or even 2 mg/Nm$^3$ or less, where Nm$^3$ is a normal cubic meter of gas, i.e., a cubic meter of gas at 0° C. and 1.01325 bar absolute. Further, by directing particulates along, and continuously scouring, the feed side of the filter medium, the filter medium remains clean and highly effective for an extended period of time even when the particulate load on the feed side is extremely high.

BRIEF DESCRIPTION OF THE DRAWINGS

FIG. 1 is a representative view of an embodiment of a process for removing entrained particulates from a gas.

DETAILED DESCRIPTION OF EMBODIMENTS OF THE INVENTION

Many different processes for removing entrained particulates from a gas, including a vapor, may embody the invention. In one of numerous examples, as shown in FIG. 1, a process embodying the invention may comprise carrying out or conducting a chemical reaction, including forming a fluidized bed 10 of particulates suspended in a gas. For many embodiments, the chemical reaction may take place largely within the fluidized bed 10, and the fluidized bed 10 may be confined or contained within a vessel 11. The vessel 11 may be any of a wide variety of pressure vessels, including, but not limited to, a chemical reactor vessel, a regenerator vessel, or a gasifier vessel. The vessel, which may be very large, may have any number of inlet ports and/or outlet ports.

A great variety of chemical reactions, including combustion reactions, synthesis reactions, decomposition reactions and catalytic reactions, may be conducted in any of numerous industries, including the refinery industry, the chemical industry, and the gasification industry. Various gases may be supplied to the chemical reaction for a number of reasons. For example, a pressurized gas supply 12 may direct a gas into the vessel 11 to generate and maintain the fluidized bed 10. One or more gases may also be supplied to the chemical reaction to facilitate the reaction in various ways, for example, as a reactant or a promoter. Further, gases, e.g., gaseous reaction products such as combustion products, may be generated as a result of the chemical reaction itself. Similarly, various particulates may be supplied to the chemical reaction for a number of reasons. For example, particulate reactants, promoters, or catalysts may be added to the chemical reaction. In addition, particulates may be generated during the chemical reaction itself, for example, as reaction products, e.g., combustion products.

The mixture of these gases and particulates may form the fluidized bed 10 of particulates suspended in the gas within the vessel 11. Gas may be supplied from the gas supply 12 to the fluidized bed 10 at a rate depending, for example, on the size of the fluidized bed, the desired density of the particulates in the fluidized bed, and the nature of chemical reaction. The temperature and pressure of the gas and particulates may vary widely, depending, for example, on the nature of the chemical reaction. For example, the temperature may be in the range from about 70° F. or less to about 1800° F. or more. The pressure may be in the range from about 5 psig or less to about 1200 psig or more. For many embodiments, the temperature may be in the range from about 550° F. or less to about 1400° F. or more and the pressure may be in the range from about 15 psig or less to about 45 psig or more.

The process may also comprise directing a portion of the gas and entrained particulates to a feed side of the filter medium. For many embodiments the filter medium 13 may be positioned within the vessel 11. For example, the filter medium 13 may be positioned in the vessel 11 above the fluidized bed 10. As the gas and entrained particulates elutriate or disperse beyond, e.g., above, the fluidized bed 10, the upper region of the vessel 11 may direct the dispersed gas and entrained particulates to the feed side 14 of the filter medium 13.

The process may further comprise filtering the entrained particulates from the gas, which includes directing the gas from a feed side 14 of the filter medium 13 through the filter medium 13 to a filtrate side 15 of the filter medium 13, the filtrate side 15 being isolated from the feed side 14 by the filter medium 13. As the gas passes through the filter medium 13, the filter medium 13 removes most or substantially all of the entrained particulates from the gas, leaving the filtered gas on the filtrate side 15 of the filter medium 13 and the particulates on the feed side 14 of the filter medium 13. Filtering the entrained particulates further includes directing at least a portion of the entrained particulates generally tangentially along the feed side 14 of the filter medium 13. As the particulates pass tangentially along the feed side 14 of the filter medium, they scour the feed side 14, preventing foulants, e.g., a filter cake of removed particulates, from building up on the feed side 14 and blocking off the filter medium 13. The gas and entrained particulates may be driven through and along the filter medium by the gas pressure within the vessel or by a blower, fan, or compressor.

The filter medium 13 may be part of a filter assembly 20 and both the filter assembly and the filter medium may be configured in any of numerous ways. For example, the filter medium may have any of a great variety of filtering characteristics. The filter medium, which is permeable, may be porous, microporous, ultraporous, or even nanoporous and may have any desired gas removal rating. For example, the filter medium may have a gas removal rating in the range from about 0.01μ or less to about 100μ or more, or from about 0.2μ or less to about 20μ or more, or from about 2μ or less to about 10 micron or more. Further, the permeable filter medium may be fashioned from any of a variety of materials, including a metallic material, a ceramic material, or a polymeric material. A metallic material or a ceramic material may be used for higher temperature applications.

The filter medium may be formed or incorporated into any of numerous structures. For many, but not all, embodiments, the filter medium may be formed as a hollow, elongate filter tube 21 having a cylindrical wall 22, which includes the filter medium 13, and opposite ends 23, 24. The length of the filter tube may be in the range from about 4 inches or less to about 240 inches or more, or from about 10 inches or less to about 100 inches or more, or from about 15 inches or less to about 60 inches or more, e.g., about 25 inches. The inner diameter (ID) of the filter tube may be in the range from about 0.25 inch or less to about 12 inches or more, or about 0.4 inch or less to about 6 inches or more, or about 0.6 inch or less to about 2 inches or more, e.g., about 0.75 inch. The ID of the filter tube may be constant or may taper from one end of the tube to the opposite end, e.g., the ID may taper to a smallest diameter at the outlet end or vice versa.

The filter assembly may support the filter medium in a variety of different ways. For example, the filter assembly 20 may include first and second spaced tube sheets 25, 26, and a plurality of filter tubes 21 may be supported between the tube sheets 25, 26 laterally spaced from one another. For example, up to about 1000 or more or up to about 3000 or more or up to about 10000 or more filter tubes may be supported between the tube sheets. For many embodiments, the filter tubes may be supported generally vertically between the tube sheets. A casing 30 may surround the filter tubes 21 and the tube sheets 25, 26. The filter assembly 20 may further include a filtered gas outlet 31, i.e., a filtrate outlet, in the casing 30 or the tube sheets 25, 26. One or more safety filters 32 may be associated with the filtered gas outlet 31 to protect against failure of any of the filter tubes 21. One or more filter assemblies 20 may be mounted within the vessel 11 in a variety of ways. For many embodiments, the filter assembly 20 may be mounted in an upper region of the vessel 11. The filtered gas outlet 31 of each filter assembly 20 may be fluidly coupled to a filtered gas plenum 33 of the vessel 11 which isolates the filtered gas from the gas and entrained particulates in the remainder of the vessel 11. The filtered gas plenum 33, in turn, may be fluidly coupled to a filtered gas outlet 34 of the vessel 11, allowing the filtered gas to be discharged from the vessel 11 for further processing or discharged as waste gas to the environment.

For many embodiments, the feed side 14 and filtrate side 15 of each filter tube 21 may comprise the inside and the outside of the filter tube 21, respectively. Directing the gas and entrained particulates to the feed side of the filter medium may comprise directing the gas and entrained particulates to the inside of the filter tube. For many embodiments, both ends 23, 24 of the filter tube 21 may be open, and the inlet end 23 of the filter tube 21 may be the upper end of the filter tube 21. Directing gas and entrained particulates to the feed side 14 of the filter medium 13 may then comprise directing gas and entrained particulates into the open upper inlet end 23 of the filter tube 21 and axially, for example, downwardly, along the inside of the filter tube 21. Alternatively, the lower open end of the filter tube may be the inlet end and directing gas and entrained particulates to the feed side of the filter medium may comprise directing gas and entrained particulates into the open lower inlet end of the filter tube and axially, for example, upwardly, along the inside of the filter tube. The axial velocity and the particulate loading at the inlet end of the filter tube may vary. For example, the gas may enter the inlet end of each tube with an axial velocity in the range from about 0.33 ft/sec or less to about 100 ft/sec or more. Depending on the nature of the filter medium and/or the nature of the particulates, the axial velocity may be limited, for example, to about 40 ft/sec or less to inhibit abrasion or erosion of the filter medium and/or attrition of the particulates. The particulate load at the inlet end of the filter tube may be, for example, in the range from about 0.1 lb/ft$^3$ or less to about 10 lbs/ft$^3$ or more or in the range from about 0.1 volumetric percent to about 50 volumetric percent.

Filtering the entrained particles from the gas may include passing the gas generally radially inside-out through the filter tube 21. For example, the gas may pass generally radially from the inner feed side 14 through the wall 22 of the filter tube 21 to the outer filtrate side 15 along the entire length of the permeable filter tube 21. The flux rate through the filter tube may vary. For example, the flux rate may be in the range from about 0.001 m/sec or less to about 0.25 m/sec or more. For many embodiments, the total area and the gas removal rating of the filter media may be selected to provide little pressure drop through the filter medium and few, if any, particulates in the filtered gas. For example, the pressure drop through the filter medium 13 may be in the range of about 15 psid or less, e.g., about 10 psid or less or about 5 psid or less, or about 3 psid or less, while the emissions in the filtered gas may be about 15 mg/Nm$^3$ or less, e.g., about 10 mg/Nm$^3$ or less, or about 5 mg/Nm$^3$ or less, or even about 2 mg/Nm$^3$ or less.

Filtering the gas may further include passing the filtered gas through a safety filter 32 associated with the filtered gas outlet 31 of the filter assembly 20. For example, the tube sheets 25, 26 may be sealed to the casing 30, and the filter assembly 20 may include a filtered gas chamber 36 bounded by the filtrate side 15 of the filter tube(s), the tube sheets 25, 26, and the casing 30. One or more safety filters may be mounted in the filtered gas chamber 36 or the filtered gas outlet 31 of the filter assembly 20. For example, one or more elongate, hollow safety filters 32, each having a blind end 40 and an open end 41, may be positioned in the filtered gas outlet 31 and supported by a tube sheet, e.g., the upper tube sheet 25. Each safety filter may include a permeable filter medium which may be coarser than the filter medium of the filter tube but which protects against failure, e.g., rupture, of a filter tube. The open end 41 of the safety filter 32 may open into the filtered gas chamber 36 of the filter assembly 20. Filtering the gas may then include directing the filtered gas from the filtrate side 15 of the filter tube(s) 21 into the filtered gas chamber 36 through the safety filter(s) 32 and into the filtered gas outlet 31 of the filter assembly 20. Alternatively or additionally, the filtered gas chamber, including the spaces between the filter tubes, may be filled with a coarse bulk filter medium, such as metal fibers, coarse ceramic particles or fibers, ceramic foam, or polymeric fibers. The bulk filter medium will act as a deep bed safety filter, capturing particulates that might pass through a defective filter tube. A bulk filter medium has the further advantage of sealing off very few filter tubes, e.g., the defective filter tube and perhaps one or more neighboring filter tubes, while leaving the vast remainder of the filter tubes perfectly functional.

Processes embodying the invention may further comprise discharging the filtered gas, either for further processing or as waste gas, e.g., to the environment. For many embodiments, discharging the filtered gas may include discharging the filtered gas from the vessel. For example, in the illustrated embodiment, discharging the filtered gas from the vessel 11 may include passing the filtered gas from the filtered gas outlet 31 of the filter assembly 20 into the filtered gas plenum 33 of the vessel 11 and hence to the filtered gas outlet of the vessel 11. Alternatively, discharging the filtered gas from the vessel may comprise passing the filtered gas from the filtered gas outlet of the filter assembly directly to the filtered gas outlet of the vessel.

As gas passes through the permeable filter medium, particulates, especially the finer particulates, may initially collect on the surface of the feed side of the filter medium and, to a much lesser extent, within the filter medium itself. For example, particulates may initially collect mostly on the surface of the inner feed side 14 of the filter tube(s) 21. Filtering the gas further includes directing at least a portion, e.g., most, of the particulates generally tangentially along the feed side of the filter medium to scour foulants, including the collected particulates, from the feed side. Particulates may have a variety of different size distributions, and the larger particulates, i.e., particulates having a size of about 5 L or greater or about 10 or greater or about 20 g or greater, may even more effectively scour foulants from the feed side of the filter medium.

Directing particulates, including the larger particulates, generally tangentially along the feed side of the filter medium may include directing particulates generally axially along the feed side for most of the length or the entire length of the permeable filter medium. For example, when the gas and entrained particulates are directed into the open inlet end 23 of the filter tube(s) 21, the particulates may be directed generally axially along the inner feed side 14 for the entire axial length of the permeable filter tube 21. For many embodiments, the particulates may be directed generally downwardly through the inside of the filter tube(s) 21. As the particulates pass generally tangentially along the feed side 14 of the filter medium 13, fluctuations in the flow stream, e.g., turbulence in the flow stream, and/or collisions with other particulates may deflect the particulates and cause the particulates to strike the feed side 14, thereby scouring the feed side 14 of any foulants, such as the finer particulates that might initially collect on the feed side 14 of the filter medium 13. By continuously scouring the feed side 14 of the filter medium 13, gas may freely pass through the permeable filter medium 13 for an extended period of time.

Virtually all of the particulates, the scoured foulants, and a small portion of the gas may exit the interior of the filter tube 21 at the open outlet end 24, for example, the lower open end, of the filter tube 21. The underflow, i.e., the gas which passes tangentially beyond the permeable filter medium but does not pass through the filter medium, may be less than about 60 percent of the gas which is initially directed to the feed side of the filter medium, e.g., the gas which is initially directed into the open inlet end 23 of the filter tube(s) 21. For many embodiments, the underflow may be about 40 percent or less, or about 20 percent or less, or about 10 percent or less, or about 7 percent or less, or about 5 percent or less of the gas entering the open inlet end 23 of the filter tubes 21, while the gas passing through the filter tubes may be about 98 percent or less of the gas entering the open inlet end 23 of the filter tubes 21.

Processes embodying the invention may further comprise directing the particulates and underflow gas from the feed side of the filter medium into a dip leg or dip tube. The dip leg 42 may be variously configured. For example, the dip leg 42 may include an elongate, hollow leg 43 having an open inlet end 44 and an outlet end 45. The open inlet end 44 of the dip leg 42 may be connected to the filter assembly 20 beyond the feed side 14 of the filter medium 13. For example, the open inlet end 44 of the dip leg 42 may be connected to a particulate outlet 46, e.g., a conical particulate outlet, of the casing 30 below the feed side 14, e.g., the inner feed sides 14, of the filter tubes 21. The open lower ends 24 of the filter tubes 21 may empty into the particulate outlet 46 of the filter assembly 20 which, in turn, empties into the open inlet end 44 of the dip leg 42. Directing the particulates from the feed side of the filter medium into the dip leg may then include directing the particulates and the underflow gas from the outlet ends of the filter tubes into the open end of the dip leg. For example, directing the particulates into the dip tube may include passing the particulates and the underflow gas from the lower open ends 24 of the filter tubes 21 through the particulate outlet 46 of the filter assembly 20 into the open inlet end 44 of the dip leg 42.

The hollow leg 43 may hang vertically below the filter assembly 20 and serves to guide the particulates and the underflow gas away from the feed side 14 of the filter medium 13. The length of the hollow leg may vary from about 1 foot or less to about 30 feet or more, and the ID may be in the range from about 2 inches or less to about 24 inches or more. The outlet end 45 of the hollow leg 43 may include a valve 50 which may be alternately closed and open. The valve may be variously configured. For example, the valve may be a flap valve which is normally closed, e.g., by a spring or by the weight of the valve, to prevent gas and entrained particulates from entering the dip leg through the outlet end. Particulates may settle by gravity or other means along the axial length of the hollow leg 43, becoming more dense in the lower region of the leg 43. As particulates accumulate within the leg 43 at the outlet end 45, the weight of the particulates may force the valve 50 open, allowing a portion of the accumulated particulates and underflow gas to escape the dip leg 42. While the density of the particulates at the outlet end of the dip leg may be greater than the density of the particulates at the open end of the dip leg, the particulates at the outlet end may remain fluidized by the underflow gas, allowing the accumulated particulates to readily flow within the hollow leg 43 and from the outlet end 45 of the dip leg 42.

The length and ID of the hollow leg 43 and the closing force of the valve 50 may be empirically adjusted to provide a back pressure which yields the desired underflow into the open end 44 of the dip leg 42. For example, the length and ID of the dip leg and the closing force of the valve may be adjusted to open and close the valve sufficiently to provide a flow of particulates and gas out of the dip leg and a back pressure within the dip leg that yields the underflow previously described into the open end of the dip leg, e.g., an underflow of about 60 percent or less. Thus, processes embodying the invention may further comprise providing a flow of particulates and gas through the dip leg, for example, a flow of particulates and gas through the dip leg that provides an underflow of about 60 percent or less into the open end of the dip leg. Further, providing the flow of particulates and gas through the dip leg may include opening and closing a valve at the outlet end of the dip leg and discharging the particulates and underflow gas from the outlet end of the dip leg. The outlet end of the dip leg may open within the vessel, e.g., into the fluidized bed. Discharging the particulates and gas from the outlet end of the dip leg may then include returning the particulates to the fluidized bed for further processing. Alternatively, the outlet end of the dip leg may open outside the vessel. Discharging the particulates and gas from the outlet end of the dip leg may then include discharging the particulates outside the vessel, e.g., for disposal, reuse, or further processing.

One of many examples of a process embodying the invention involves the regeneration of catalyst particulates used in a fluid catalyst cracker in the refinery industry. Catalyst particulates are supplied to a reactor to facilitate processing oil into more refined hydrocarbons, such as gasoline or diesel fuel. In this process the catalyst particulates become fouled with a coke-like substance that lessens the catalytic effect of the catalyst particulates. To regenerate the catalyst particulates, the coke-like substance may be burned off of the catalyst particulates, allowing the catalyst particulates to be reused.

Regenerating the fouled catalyst particulates may include forming a fluidized bed 10 including the fouled catalyst particulates suspended in hot air in a regenerator vessel 11, e.g., in a lower region of the regenerator vessel 11, as shown in FIG. 1 Forming the fluidized bed 10 may include supplying hot air to the regenerator vessel 11, e.g., to the bottom of the regenerator vessel 11, from a hot air supply 12 and supplying fouled catalyst particulates, e.g., from the reactor (not shown), to the regenerator vessel 11 via a fouled catalyst particulate inlet 51. The hot air may have a temperature in the range from about 1250° F. to about 1400° F. and a pressure in the range from about 15 psig to about 45 psig. The fouled catalyst particulates may have a size distribution in which 99 percent of the particulates are smaller than about 90μ and $D_{50}$ is about 60μ.

The process may further include directing a portion of the air and entrained catalyst particulates to the feed side 14 of the filter medium 13, e.g., into the inner feed side 14 of a plurality of filter tubes 21. For example, some of the air and gaseous combustion products and entrained catalyst particulates may disperse beyond, e.g., above, the fluidized bed 10 driven by the gas pressure with the regenerator vessel 11. The regenerator vessel 11 may direct the dispersed gas and catalyst particulates into the open inlet ends 23 of the filter tubes 21 of a filter assembly 20 positioned in the regenerator vessel 11 above the fluidized bed 10, where the gas and entrained catalyst particulates are directed axially, e.g., downwardly, along the inner feed sides 14 of the filter tubes 21. The axial velocity of the gas within the filter tubes 21 may be in the range from about 0.33 ft/sec to about 100 ft/sec, and the particulate load at the open inlet ends 23 of the filter tubes 21 may be in the range from about 0.1 lb/ft$^3$ to about 10 lbs/ft$^3$.

The process may further include filtering the entrained catalyst particulates from the gas, including directing the gas from the feed side 14 of the filter medium 13 through the filter medium 13 to a filtrate side 15 of the filter medium 13. Specifically, the gas may be directed generally radially inside-out through the filter tubes 21 from the inner feed side 14 to the outer filtrate side 15. The flux rate may be in the range from about 0.001 m/sec to about 0.25 m/sec, and the particulate load in the filtered gas may be about 15 mg/Nm3 or less. The filtered gas may then be discharged from the regenerator vessel 11. From the filtrate sides 15 of the filter tubes 21, the filtered gas may be driven by the gas pressure within the vessel 11 through the filtered gas chamber 36 and the safety filter 32 to the filtered gas outlet 31 of the filter assembly 20. From the filtered gas outlet 31 of the filter assembly 20, the filtered gas may be driven into the filtered gas plenum 33 and the discharged from the regenerator vessel 11 via the filtered gas outlet 34 of the regenerator vessel 11. The gas may then be discharged to the environment as a waste gas containing few, if any, particulates.

Filtering the entrained catalyst particulates from the gas may further include directing at least a portion of the entrained catalyst particulates generally tangentially along the feed side 14 of the filter medium 13 to scour the feed side 14 of the filter medium 13. Most of the entrained catalyst particulates, including the larger particulates, may be directed axially downwardly along the inner feed side 14 of each filter tube 21 from the open inlet end 23 to the open outlet end 24. As the catalyst particulates traverse the inner feed side 14 of each filter tube 21, they scour foulants from the inner feed side 14, allowing gas to freely pass through the filter tube 21 for an extended period of time.

The process may additionally comprise directing the catalyst particulates from the feed side 14 of the filter medium 13 into a dip leg 42 in the regenerator vessel 11. The catalyst particulates and the underflow gas pass from the open outlet ends 24 of the filter tubes 21 downwardly through the particulate outlet 46 of the filter assembly 20 into the open inlet end 44 of the dip leg 42. The length and ID of the dip leg 42 and the closing force of the valve 50 are adjusted to provide an underflow of about 60 percent or less into the open inlet end 44 of the dip leg 42. The catalyst particulates and the underflow gas pass along the hollow leg 43 and exit the dip leg 42 via the opening and closing valve 50. From the dip leg 42, the catalyst particulates are discharged into the fluidized bed 10 within the regenerator vessel 11 for further processing. The regenerated catalyst particulates are discharged from the regenerator vessel 11 via a regenerated catalyst particulate outlet 52.

While various aspects of the invention have been described and/or illustrated with respect to several embodiments, the invention is not limited to these embodiments. For instance, one or more features of these embodiments may be eliminated or modified, or one or more features of one embodiment may be combined with one or more features of another embodiment, without departing from the scope of the invention. Even embodiments with very different features may fall within the scope of the invention.

For example, the filter assembly may be arranged within the vessel with the feed side and the filtrate side of the filter medium comprising the outside and the inside, respectfully, of each filter tube. Directing the gas and entrained particulates to the feed side of the filter medium may then comprise directing the gas and entrained particulates to the outside of the filter tubes, for example, at the upper end of each filter tube, and axially, e.g., downwardly, along the outside of each filter tube. One end of each filter tube, e.g., the lower end, may be blind while the other end, e.g., the upper end, may be open. Directing the gas from the feed side through the filter medium to the filtrate side may include directing the gas from the outer feed side of each filter tube generally radially outside-in through the wall of the filter tube to the inner filtrate side of the filter tube. The inner filtrate side of each filter tube may fluidly communicate, either directly or via a safety filter, with the filtered fluid outlet of the filter assembly. Discharging the filtered gas may then include directing the filtered gas from the inner filtrate side of each filter tube to the filtered gas outlet of the filter assembly via the open end of the filter tube and hence to the filtered gas outlet of the vessel, either directly or via a filtered gas plenum within the vessel that is fluidly coupled to the open ends of the filter tubes. Similarly, directing at least a portion of the particulates generally tangentially along the feed side of the filter medium may include directing the particulates generally axially, e.g., downwardly, along the outer feed side of each filter tube to scour the outer feed side. For example, the particulates may be directed generally downwardly along the entire length of the outer feed side of the filter tube past the lower blind end and then into the dip leg.

As an example of another embodiment, the filter assembly and the dip leg may be located in a separate housing outside of the vessel. Directing the gas and entrained particulates to the feed side of the filter medium may include channeling the gas and entrained particulates via ducts or pipes from the vessel to the separate housing. Discharging the filtered gas may include discharging the filtered gas from the housing rather than from the vessel. Further, discharging the particulates from the dip leg may include directing the particulates away from the vessel for reuse or disposal or returning the particulates to the fluidized bed in the vessel for further processing.

In other embodiments, directing the gas and entrained particulates to the feed side of the filter medium may include increasing the velocity of the entrained particulates and/or the gas and then directing the higher velocity entrained particulates and/or gas to the feed side of the filter medium. For example, each filter tube may be fitted with a hollow impermeable accelerator tube at the inlet end of the permeable filter tube. The accelerator tube may have a length in the range from about 2 inches or less to about 30 inches or more and may have a constant or tapering ID that equals or tapers to the ID of the filter tube. The accelerator tube serves to accelerate the particulates and/or the gas before they contact the feed side of the filter medium, e.g., the inner feed side of the filter tubes, enhancing the scouring effect of the particulates.

In still other embodiments, directing at least a portion of the particulates generally tangentially along the feed side of the filter medium may include diverting the particulates against the feed side of the filter medium. For example, a diverter may be inserted within the inner feed side of a filter tube or along the outer feed side of a filter tube to deflect particulates against the feed side of the filter tube. The diverter may be variously shaped and may extend partially or entirely along the length of the filter tube. By deflecting the particulates against the feed side of the filter tube, even more of the particulates strike the feed side of the filter tube, enhancing the scouring effect of the particulates.

Many other techniques may supplement processes embodying the invention. For example, an intermittent gas pulse may be directed forward or backward through the filter medium to further clean the filter medium of foulants, a vibrator may intermittently vibrate the filter medium or the filtered gas flow through the filter medium may be intermittently terminated to loosen foulants from the filter medium, or a cleaning solution may be applied to the filter medium to wash foulants from the filter medium.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as," "for example", or "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A process for removing entrained particulates from a gas comprising:
   conducting a chemical reaction in a vessel, including suspending particulates in a gas in a fluidized bed in the vessel;
   directing a portion of the gas and entrained particulates to a permeable filter medium in the vessel;
   filtering a substantial portion of the entrained particulates from the gas within the vessel, including directing the gas from a feed side of the filter medium through the filter medium to a filtrate side of the filter medium in the vessel and directing at least a portion of the entrained particulates generally tangentially along the feed side of the filter medium to scour the feed side of the filter medium in the vessel; and
   directing the particulates from the feed side of the filter medium into a dip leg in the vessel, the process further comprising discharging the filtered gas from the vessel.

2. The process of claim 1 further comprising passing the particulates from the dip leg to the fluidized bed in the vessel.

3. The process of claim 1 wherein directing the gas through the filter medium includes directing the gas radially through a plurality of hollow, elongate, filter tubes, each filter tube including a filter medium, and wherein directing at least a portion of the entrained particulates along the feed side of the filter medium includes directing entrained particulates generally axially along the feed sides of the filter tubes.

4. The process of claim 3 wherein directing gas radially through a plurality of filter tubes includes directing the gas radially inside-out through the filter tubes, wherein directing the entrained particulates generally axially along the feed sides of the filter tubes includes directing the entrained particulates generally downwardly along the feed sides within the filter tubes from an inlet end to an outlet end of each tube, and wherein directing the particulates into a dip leg includes directing the particulates from the outlet end of each filter tube into the dip leg below the filter tubes.

5. The process of claim 1 wherein directing a portion of the gas and entrained particulates to the feed side of the filter medium includes increasing the velocity of the gas and entrained particulates and then directing the higher velocity gas and entrained particulates to the feed side of the filter medium.

6. The process of claim 1 wherein directing at least a portion of the particulates generally tangentially along the feed side of the filter medium includes diverting the particulates against the feed side of the filter medium.

7. A process for removing catalyst particulates from a gas comprising:
   regenerating catalyst particulates, including suspending catalyst particulates in a hot gas in a fluidized bed in a regenerator vessel;
   directing a portion of the gas and entrained catalyst particulates to a feed side of a permeable filter medium in the regenerator vessel;
   filtering the entrained catalyst particulates from the gas in the regenerator vessel, including directing the gas from the feed side of the filter medium through the filter medium to a filtrate side of the filter medium and directing at least a portion of the entrained catalyst particulates generally tangentially along the feed side of the filter medium to scour the feed side of the filter medium;
   discharging the filtered gas from the regenerator vessel; and
   directing the catalyst particulates from the feed side of the filter medium into a dip leg in the regenerator vessel.

8. The process of claim 7 further comprising passing the catalyst particulates from the dip leg into the fluidized bed in the regenerator vessel.

9. The process of claim 7 wherein directing the gas through the filter medium includes directing the gas radially through a plurality of hollow, elongate, filter tubes, each filter tube including a filter medium, and wherein directing at least a portion of the entrained catalyst particulates along the feed side of the filter medium includes directing entrained catalyst particulates generally axially along the feed sides of the filter tubes.

10. The process of claim 9 wherein directing gas radially through a plurality of filter tubes includes directing the gas radially inside-out through the filter tubes, wherein directing the entrained catalyst particulates generally axially along the feed sides of the filter tubes includes directing the entrained particulates generally downwardly along the feed sides within the filter tubes from an inlet end to an outlet end of each tube, and wherein directing the catalyst particulates into a dip leg includes directing the particulates from the outlet end of each filter tube into the dip leg below the filter tubes.

\* \* \* \* \*